(12) United States Patent
Parmeter et al.

(10) Patent No.: US 6,566,774 B2
(45) Date of Patent: May 20, 2003

(54) VIBRATION DAMPING SYSTEM FOR ESP MOTOR

(75) Inventors: Larry James Parmeter, Broken Arrow, OK (US); Dick L. Knox, Claremore, OK (US)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 09/803,596

(22) Filed: Mar. 9, 2001

(65) Prior Publication Data

US 2002/0125777 A1 Sep. 12, 2002

(51) Int. Cl.⁷ ................................................. H02K 5/16
(52) U.S. Cl. ............................................ 310/90; 310/87
(58) Field of Search ................................ 310/87, 90, 91

(56) References Cited

U.S. PATENT DOCUMENTS

| | | |
|---|---|---|
| 3,118,384 A | 1/1964 | Sence et al. |
| 3,196,301 A | 7/1965 | Turk |
| RE28,094 E | 7/1974 | Boyd |
| 4,119,874 A | 10/1978 | Beavers et al. |
| 4,435,661 A | 3/1984 | Witten |
| 4,513,215 A | 4/1985 | Del Serra |
| 4,521,708 A | 6/1985 | Vandevier |
| 4,597,679 A | 7/1986 | Wlodkowski |
| 4,620,804 A | 11/1986 | Goyne |
| 4,890,937 A * | 1/1990 | Balsells ........................ 277/589 |
| 5,189,328 A | 2/1993 | Knox |
| 5,209,577 A * | 5/1993 | Swatek ........................ 384/220 |
| 5,231,374 A * | 7/1993 | Larsen et al. ................ 310/232 |
| 6,091,175 A * | 7/2000 | Kinsinger .................... 277/438 |

OTHER PUBLICATIONS

*Axial View of a Typical Squeeze Film Bearing.*
*Analysis and Design of Squeeze film Bearings*, by L.E. Barrett, Department of Mechanical and Aerospace Engineering, School of Engineering and Applied Science, University of Virginia, Charlottesville, Virginia.
*The Design and Application of a Squeeze Film Damper Bearing to a Flexible Steam Turbine Rotor*, Turbo Components & Engineering, presented and published in the Proceedings of the 24$^{th}$ Turbomachinery Symposium, Sep. 25–28, 1995.

* cited by examiner

Primary Examiner—Nestor Ramirez
Assistant Examiner—Nguyen Hanh
(74) Attorney, Agent, or Firm—Bracewell & Patterson, L.L.P.

(57) ABSTRACT

Arrangements are described wherein fluid is supplied under pressure to lubricate and replenish the fluid film located between the rotating, inner bearing sleeve and the outer, stationary sleeve insert of the bearing assemblies of a motor. The sleeve insert is provided with fluid metering passages that permit lubricating fluid to pass through the body of the sleeve insert. The sleeve insert is disposed radially within a sleeve insert holder, and a fluid gap is defined between the two components. During operation, vibration of the rotor shaft within the stator bore is damped by the fluid spring created by the metering of fluid through the sleeve insert. As a result, friction is reduced and the lifespan of the motor increased.

17 Claims, 4 Drawing Sheets

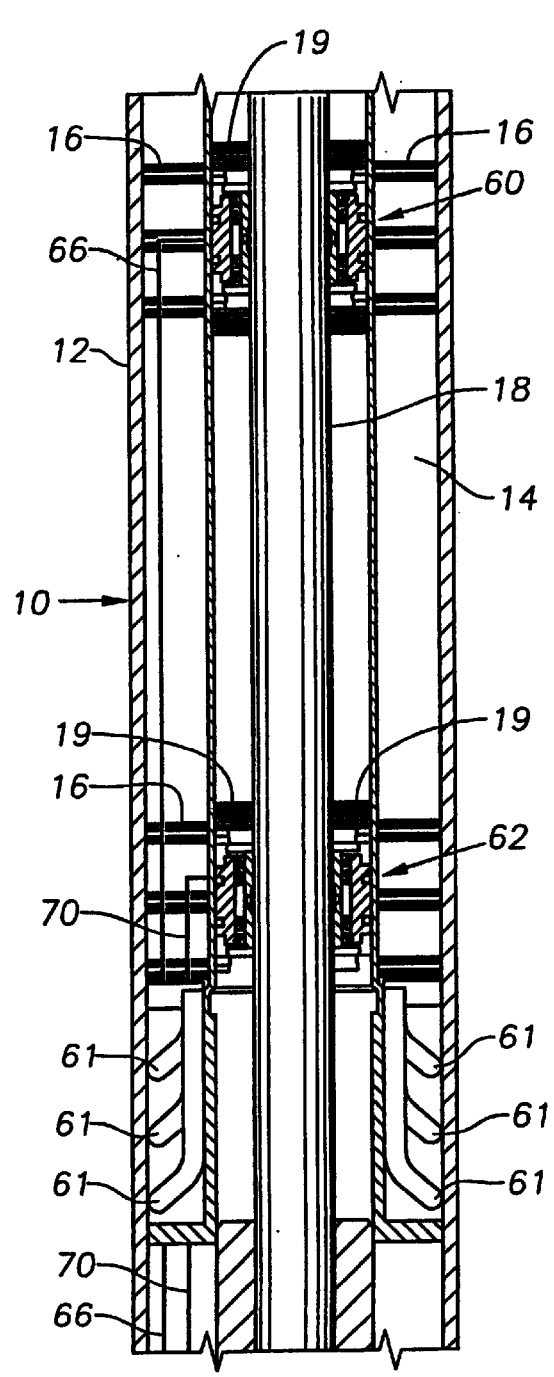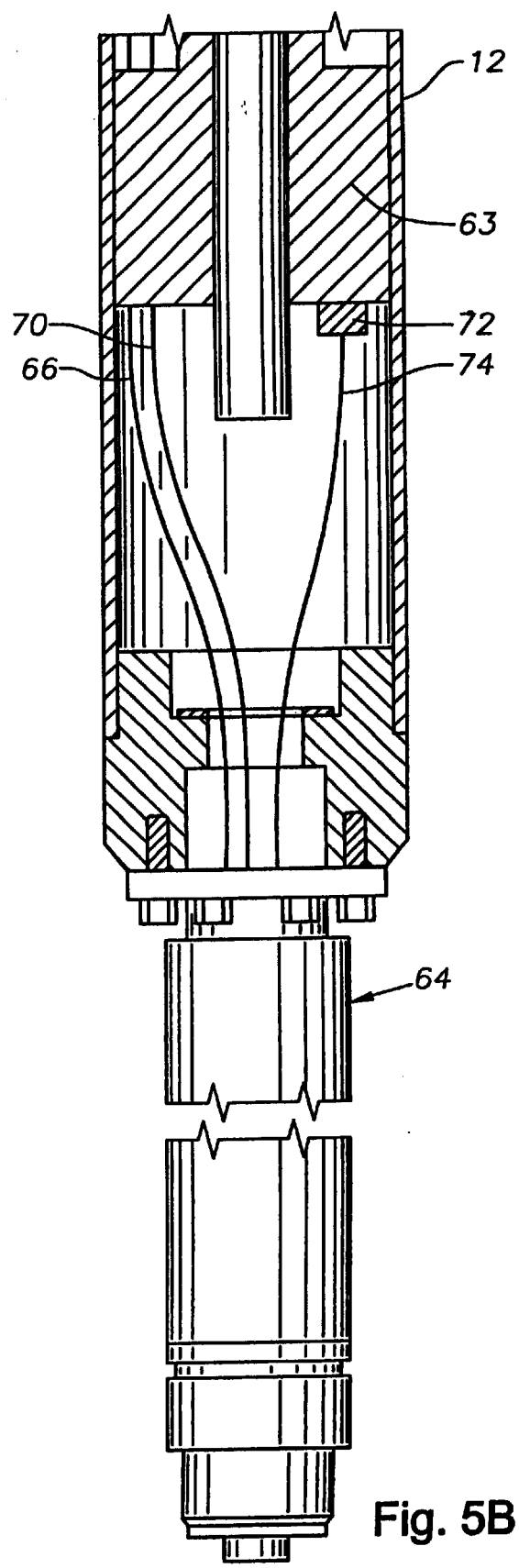
Fig. 5A
Fig. 5B

VIBRATION DAMPING SYSTEM FOR ESP MOTOR

BACKGROUND OF THE INVENTION

1. Field of the Invention

The present invention relates to fluid film bearings. In more particular aspects, the invention relates to improved motor bearings for electrical submersible pumps and the like whose motor shafts are maintained in a substantially vertical position during operation.

2. Description of the Related Art

Electrical submersible pumps (ESP's) include an electric motor and a pump that is used to pump oil or other fluids within a wellbore. The electric motors have a rotatable rotor that is contained within a stationary stator. The rotors for the submersible pumps are usually disposed in a substantially vertical position by virtue of their placement in wellbores, which typically are vertical shafts. Therefore, during operation, the rotor shaft of the motor is oriented in the vertical position.

The bearings which surround the rotor shaft are often of the fluid film variety. However, fluid film bearings require a side load to provide optimal dynamic stability. Since the rotor shaft is rotating in a vertical position, there is little or no side load being applied to the bearing during operation. This causes instability in the bearings, which results in excessive motor vibration. Excessive vibration in the bearings can cause the bearing sleeves to break through the oil film resulting in metal to metal contact that can lead to premature wear and motor failure.

Alternative bearing systems have not proven effective in the long term. High wellbore temperatures make elastomers undesirable in such a bearing, particularly as a wear surface. Friction fit rotor bearing assemblies tend to become loose as temperatures change in the wellbore.

Fluid film bearings or bearings that support the shaft of a rotor on fluid are not new. For example, U.S. Pat. No. 3,118,384 issued to Sence et al. describes fluid pressure bearings wherein high pressure fluid is injected to prevent the rotor from contacting the stator. U.S. Pat. No. 3,196,301 issued to Turk discusses fluid film bearings and describes a technique for using an impeller to axially draw fluid in to the bearing to provide clearance between the rotor and stator. However, these arrangements are, in practice, vulnerable to damage from vibration of the rotor shaft within the stator. Mere flowing of fluid around the rotor does not provide effective resistance or dampening of strong vibrations, such as tend to occur in downhole motors.

It would be desirable to have devices and methods that address the problems of the prior art.

SUMMARY OF THE INVENTION

A novel bearing assembly and bearing system for a motor is described wherein a fluid shock absorber is provided to cushion and dampen vibration of the rotor shaft. Lubricating fluid is supplied under pressure to lubricate and replenish the fluid film located between the rotating, inner bearing sleeve and the outer, stationary sleeve insert of the bearing assemblies of a motor. The sleeve insert is provided with fluid metering passages that permit lubricating fluid to pass through the body of the sleeve insert. The sleeve insert is disposed radially within a sleeve insert holder, and a fluid gap is defined between the two components.

During operation, vibration of the rotor shaft within the stator bore is damped by the fluid spring created by the metering of fluid through the sleeve insert. As a result, friction is reduced and the lifespan of the motor increased.

BRIEF DESCRIPTION OF THE DRAWINGS

FIGS. 5A and 5B are a side cross-sectional view of an exemplary motor incorporating bearing assemblies constructed in accordance with the present invention as well as a vibration and temperature sensing arrangement.

DETAILED DESCRIPTION OF PREFERRED EMBODIMENTS

Figure 1:
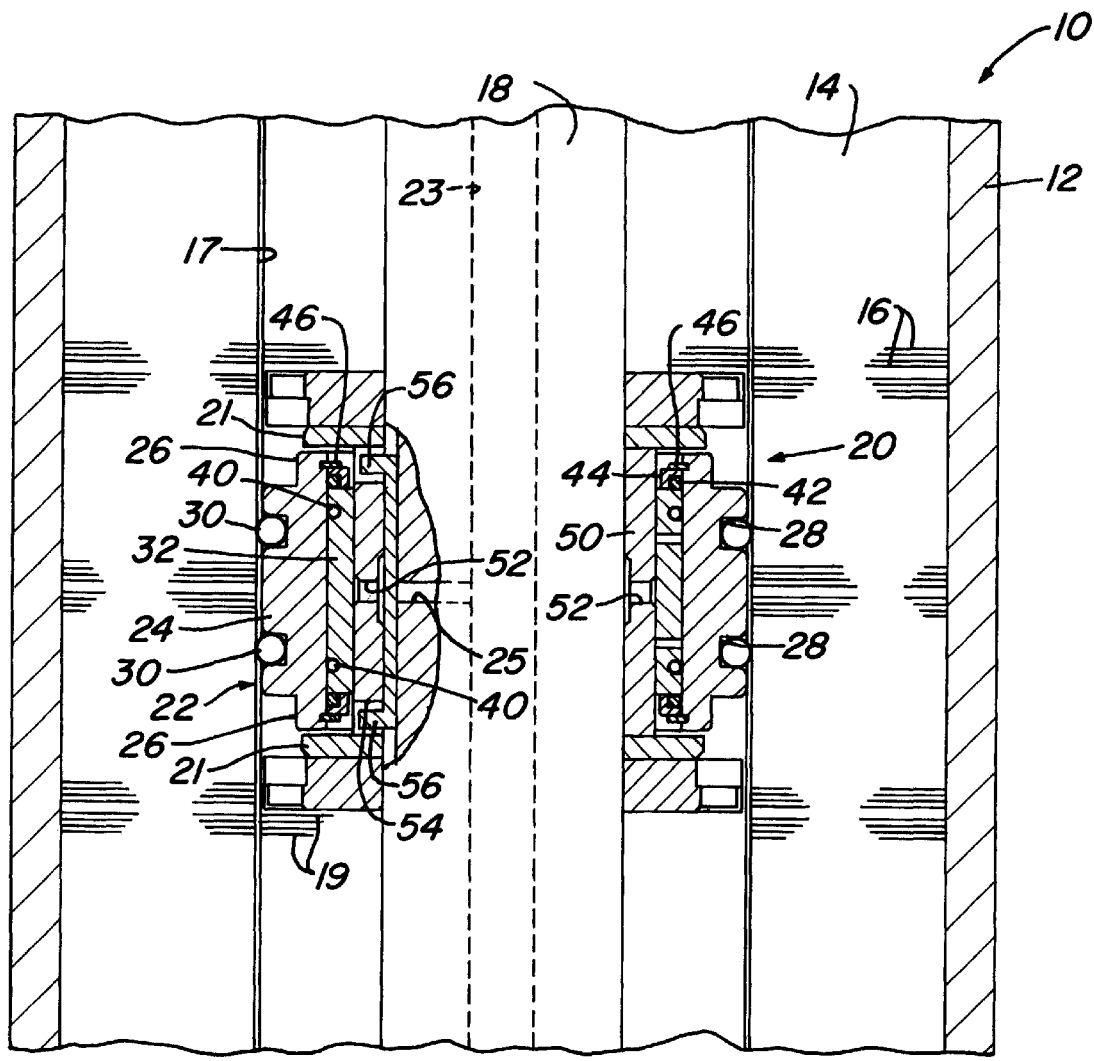
FIG. 1 is a side cross-sectional view of an exemplary motor bearing assembly constructed in accordance with the present invention.
Figure 2:
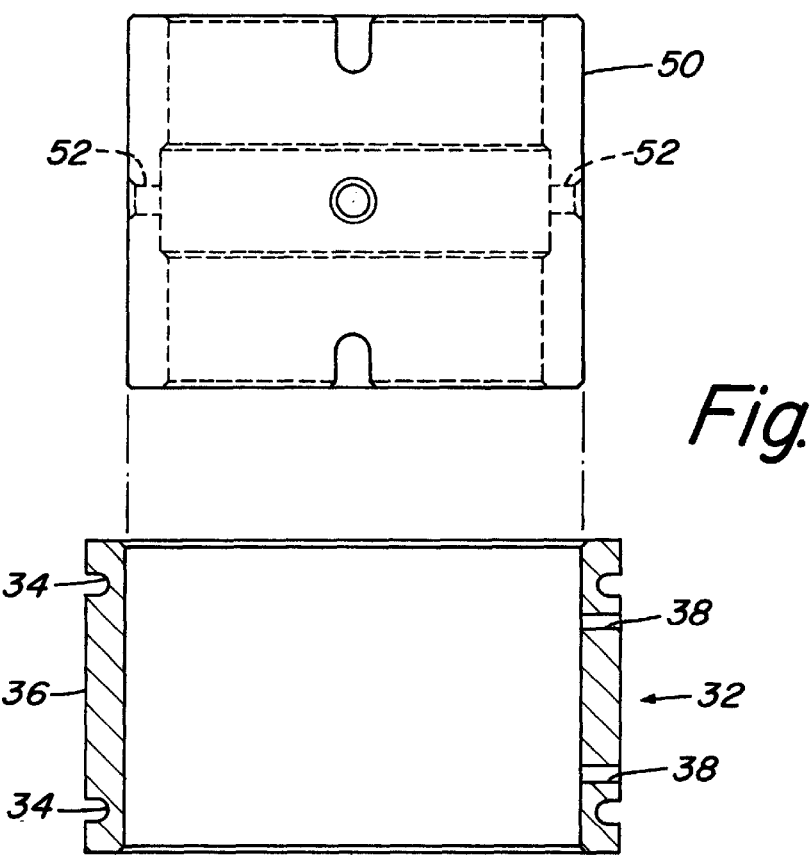
FIG. 2 is a side view, partially in cross-section, of an exemplary bearing sleeve and sleeve insert used in the assembly shown in FIG. 1.
Figure 3:
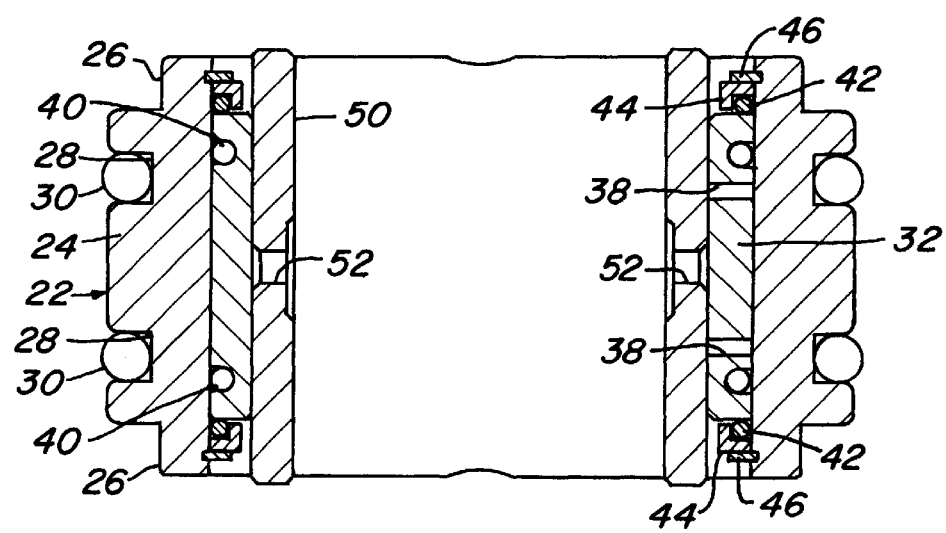
FIG. 3 is a side cross-sectional view of a portion of an exemplary bearing assembly shown apart from the stator.

FIGS. 1 through 4 illustrate a bearing assembly constructed in accordance with the invention. FIG. 1 shows a portion of an electrical submersible pump motor 10 that has an outer housing 12 that encloses a stator 14. The stator 14 is made up of a number of laminations 16 and encloses a bore 17. A rotor shaft 18 is rotatably disposed within the bore 17 of the stator 14 and supported by bearing assembly 20. It is pointed out that, while only a single bearing assembly 20 is depicted here, there are, in fact, a number of similar bearing assemblies, all of which surround the rotor shaft 18 within the same motor 10. The bearing assembly 20 is representative of each of these, and it should be recognized that a number of such assemblies, in combination, will form a bearing system for support of the rotor shaft 18 in the motor 10.

The rotor shaft 18 carries cylindrical laminated plates 19, and thrust washers 21 surround the rotor shaft 18 and abut the bearing assembly 20. The rotor shaft 18 also defines a central longitudinal bore 23 having lateral fluid flow passages 25 that extend radially outwardly from the central bore 23.

The bearing assembly 20 includes several concentric members that will be described from the radial outside moving inward. The bearing assembly 20 includes an annular bearing sleeve insert holder 22 that presents a central portion 24 of enlarged diameter and two axial portions 26 of reduced diameter. A pair of grooves 28 are disposed in the enlarged diameter portion 24. Annular anti-rotation extension springs 30 are disposed each of the grooves 28. When so disposed, the springs 30 extend outwardly slightly from the grooves 28 (see FIG. 4). When the bearing sleeve insert holder 22 is inserted into the bore 17, the springs 30 are urged against the bore 17 and are compressed to form a resilient seal.

A sleeve insert 32 is located radially within the bearing sleeve insert holder 22. The sleeve insert 32 (shown apart from the bearing assembly in FIG. 2) is an annular ring that has two grooves 34 in its external surface 36. As will be apparent, the sleeve insert 32 contacts the fluid within a fluid chamber along its external radial surface while its internal radial surface contacts a fluid film barrier that helps to support the rotor shaft 18 and reduce damage to the rotor shaft 18 due to friction and abrasion. Fluid metering holes 38 are disposed through the insert 32. There are preferably only two such holes 38 that have a minimal diameter so that fluid is transmitted, or metered, through the holes 38 slowly and some of the mechanical energy that has been imparted to the fluid will be converted to heat energy via such metering. Currently, a diameter of about $\frac{1}{16}$th of an inch is believed to be optimal for the holes 38.

Anti-rotation extension springs 40 reside within the grooves 34 so that the sleeve insert 32 is prevented from rotating with respect to the sleeve insert holder 22. At either axial end of the sleeve insert 32, an annular oil seal 42 and oil seal compression cap 44 are located. Each oil seal 42 supplements the resilient seal provided by the spring 40 in closing off the fluid chamber (described shortly) which is defined in part by the springs 40. A snap ring 46 is positioned outside of either compression cap 44. The snap rings 46 engage the inner surface of the bearing sleeve insert holder 22 and thereby help to lock the insert holder 22 and the sleeve insert 32 together.

A bearing sleeve 50 is disposed radially within the sleeve insert 32. The bearing sleeve 50 is an annular member that is keyed to the rotor shaft 18 so as to rotate with the shaft 18 and functions as a wear sleeve that protects the rotor shaft 18 from abrasion and friction damages. The bearing sleeve 50 contains four (only three visible in FIG. 2) fluid communication openings 52 that are disposed at 90 degree angles from one another about the periphery of the sleeve 50. There are key notches 54 cut into the sleeve 50 at the upper and lower axial ends of the sleeve 50 into which complimentary shaped key members 56 on the shaft 18 will reside to spline the bearing sleeve 50 to the shaft 18.

Figure 4:
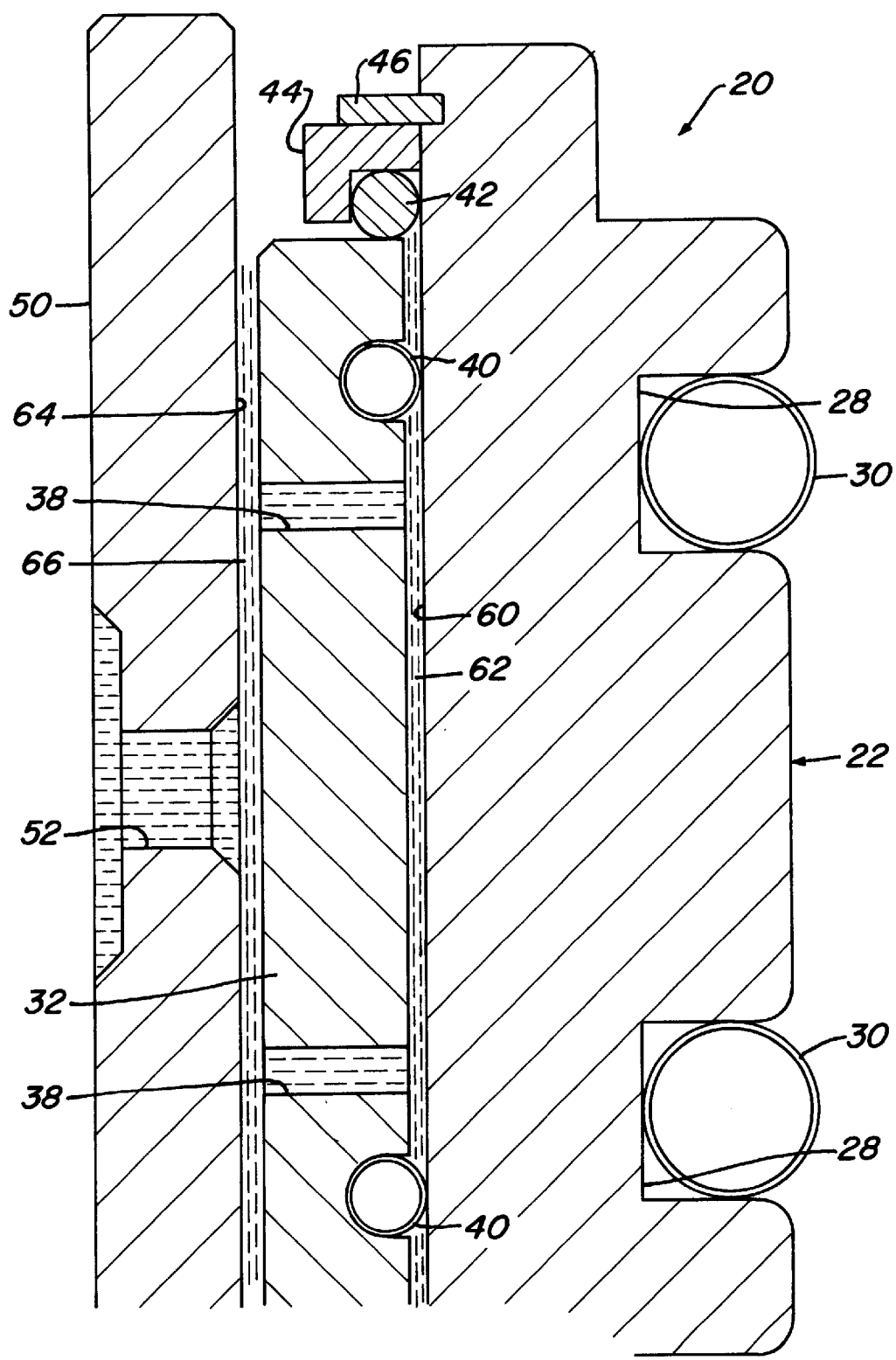
FIG. 4 is a close-up cross-sectional view illustrating some of the fluid-related features of the bearing in greater detail.

Referring now to FIG. 4, the construction of one side of the bearing assembly 20 is shown in close up with some of the gaps and spaces between various components being exaggerated in order to facilitate explanation of portions of the invention. As illustrated there, there is a narrow chamber 60 defined between the sleeve insert 32 and the sleeve insert holder 22 within which a fluid film 62 of fluid resides. The most common and preferred type of fluid to be used for this application is oil, which is substantially incompressible. The chamber 60 is closed off at each end by the contact between anti-rotation springs 40 and the sleeve insert holder 22. It is noted, however, that the width of the chamber 60 can vary by virtue of the fact that contact with the inner surface of the sleeve insert holder 22 is accomplished by springs that are initially compressed when inserted into the holder 22.

A gap 64 is present between the sleeve insert 32 and the bearing sleeve 50. A second fluid film 66 resides within the gap 64. During normal operation and absent system vibrations, the chamber 60 has a width of approximately 0.005 inches while the gap 64 is approximately 0.003 inches in width. The fluid within chamber 60 and gap 64 is disposed therein by pumping through bore 23 and lateral fluid passages 25 and then transmitted through the fluid communication openings 52 of the bearing sleeve 50. It is pointed out that the oil is also present within the fluid metering passages 38 of the insert 32.

In operation, the rotor 18 rotates and the bearing sleeve 50 rotates with it. The sleeve insert 32 and sleeve insert holder 22 do not rotate. During operation, fluid, such as an oil lubricant, is transmitted through the central bore 23 under pressure, the lateral fluid passages 25 and fluid communication openings 52 to continually replenish the fluid film layer 66 in gap 64.

The use of the pumped in fluid and the fluid metering openings 38 provide a shock absorption function against vibration of the rotor 18 within the stator 14 and thereby curb instability in the system due to vibration. As the rotor shaft 18 moves laterally within the bore 17, such as would result from system vibration, one side of the bearing sleeve 50 is compressed against the sleeve insert 32 causing the fluid entrapped therebetween to be metered through the metering passages 38 and into the chamber 60. The metering passages 38 act like hydraulic metering valves. The fluid absorbs the vibration and converts the mechanical energy associated with it into heat.

Conversely, when the rotor shaft 18 moves in the opposite direction as a result of vibration (i.e., so that the bearing sleeve 50 is moved away from the sleeve insert 32, oil is drawn from the gap 60 through the metering passages 38 into the second gap 64. One the opposite side of the rotor shaft 18, the opposite actions occur. In either case (whether the shaft 18 and bearing sleeve 50 are moved toward or away from the sleeve insert 32), fluid is drawn through the metering passages 38 and the mechanical energy associated with the vibration is converted into heat energy.

The sizes of gaps 60 and 64 may vary as required by the type of lubricating fluid used. However, the gaps 64 should be of sufficient size to permit a fluid film to reside therein that will resist friction between the bearing sleeve 50 and the sleeve insert 32. Any incidental friction or vibration induced contact is borne by the bearing sleeve 50 rather than the rotor shaft 18 itself. The resilient sealing of the fluid chamber 60, which is provided by the annular springs 40, is desirable in that it permits the volume of the fluid chamber 60 to expand and contract slightly to accommodate increases and decreases in the amount of fluid that is retained within the chamber 60.

It can be seen, then, that the bearing assembly 20 provides a fluid spring that dampens vibrations of the rotor shaft 18 within the stator bore 17. In addition, the pressurized fluid within bore 23 constantly lubricates and replenishes the bearing assembly 20. Since the bearing assembly 20 does not rely upon elastomeric components to provide wear surfaces, the assembly can be operated at very high temperatures.

Referring now to FIGS. 5A and 5B, there is shown an enlarged view of the lower portion of the exemplary motor 10 which incorporates bearing assemblies to support the rotor 18 within stator 14. Only the two lower bearing assemblies 60, 62 are shown. It should be understood that there are additional bearing assemblies (not shown) located at regular intervals within the motor 10. The bearing assemblies 60, 62 are constructed and operate in the manner of the bearing assembly 20 described earlier. In this view, it is possible to see the wire bundles 61 that form the terminus of the laminations and windings 16, 19 of the stator 14. A tubular base 62 is secured within the housing 12 below the bundles.

A processor sub 64 is shown affixed to the lower end of the motor 10. The processor sub 64 houses a multi-measurement sensor that is capable of processing sensed parameters and transmitting that information to the surface of the wellbore. One example of a suitable processor sub 64 is "The Tracker," a device manufactured and marketed by the assignee of the present invention.

A variety of exemplary sensor devices are shown schematically within the motor 10 for sensing abnormalities in the operation of the bearing assemblies 60, 62, such as excessive vibration. A first thermocouple sensor 66 is disposed between adjacent laminations 16 in the stator 14. The first thermocouple sensor 66 is located within the stator 14 to be proximate the upper bearing assembly 60 and extends downwardly through the stator 14 to the processing sub 64. The thermocouple sensor 66 is an elongated, wire-like sensor that is made of two dissimilar metals. Each of these metals will expand and contract at different rates to changes in temperature proximate the upper bearing assembly 60, and the amount of differential expansion can be detected by the processor sub 64. Although the thermocouple sensor 66 is depicted within the motor housing 12 as being disposed vertically through the laminations 16, it should be understood that this depiction is schematic only, and that in actuality, the sensor 66 is layered in a coiled fashion with the laminated winds 16 of the stator 14. A second thermocouple sensor 70 is disposed between adjacent laminations 16 in the stator 14, but is located within the stator 14 so as to be proximate the lower bearing assembly 62. The second thermocouple 70 senses changes in temperature proximate the lower bearing assembly 62.

As can be seen in FIG. 5B, there is an accelerometer 72 secured to the lower end of the base 63. The accelerometer 72 detects vibrations in the base 63 that are transmitted to it by vibration of the rotor 18. Cable 74 interconnects the accelerometer 72 to the processor sub 64.

Excessive vibration of the rotor 18 within the stator 14 during operation of the motor 10 is sensed by some or all of the sensors (66, 70, 72) described above. The sensed information is transmitted to the processor sub 64 where it is recorded and/or transmitted to the surface of the well. Excessive vibration of the rotor 18 proximate a particular bearing assembly (60 or 62) would be expected to raise the temperature proximate that bearing assembly. This rise in temperature would be detectable by the processor sub 64 via the thermocouple sensor (66 or 74) located near that particular bearing assembly. Additionally, general excessive vibration of the rotor 18 at or around its lower end would be detected by the accelerometer 72 with this detected condition being transmitted to the processor sub 64.

While the invention has been shown in only some of its forms, it should be apparent to those skilled in the art that it is not so limited, but is susceptible to various changes without departing from the scope of the invention.

What is claimed is:

1. An electrical submersible pump motor having a rotor mounted to a rotatable shaft and located within a stationary stator, a bearing assembly for radially supporting the shaft comprising:
    a fixed annular bearing carrier positioned within the stator;
    an anti-rotation member on an outer diameter of the bearing carrier that frictionally grips the stator to prevent rotation of the bearing carrier;
    a bearing sleeve secured to the shaft for rotation therewith, the bearing sleeve being disposed within an inner diameter of the bearing carrier;
    an axial passage extending through the shaft for circulating fluid, the axial passage having at least one lateral outlet that leads to an inner diameter of the bearing sleeve;
    a communication passage extending from an inner diameter of the bearing sleeve to an outer diameter of the bearing sleeve;
    a fixed annular sleeve insert located between the bearing sleeve and the bearing carrier, defining a gap between the bearing sleeve and the sleeve insert that receives fluid from the communication passage in the bearing sleeve, the sleeve insert having ends that face in opposite axial directions;
    a pair of seals that seal between the sleeve insert and the bearing carrier, defining an annular fluid chamber, each of the seals being located in sealing engagement with one of the ends and the inner diameter of the bearing carrier; and
    a metering passage extending through the sleeve insert for allowing communication of lubricant between the gap and the fluid chamber.

2. The bearing assembly of claim 1 wherein the anti-rotation member comprises an annular anti-rotation spring that resides in a groove within the outer diameter of the bearing carrier.

3. The electrical submersible pump motor of claim 1 further comprising a sensor device in operable association with at least one of said plurality of bearing assemblies for detection of an abnormality in the operation of said bearing assembly.

4. The electrical submersible pump motor of claim 3 where in the sensor device is operably associated with a multi-measurement sensor sub that is operable to process sensed parameters and transmit said parameters to a surface of a well bore.

5. The electrical submersible pump motor of claim 3, wherein the sensor device comprises a thermocouple sensor for sensing changes in temperature proximate said bearing assembly.

6. The electrical submersible pump motor of claim 3 wherein the sensor device comprises an accelerometer.

7. The electrical submersible pump motor of claim 1 further comprising at least one anti-friction element located in the fluid chamber, with one of the seals located above the anti-friction element and the other of the seals located below the anti-friction element.

8. A motor for an electrical submersible pump, comprising:
    a stator defining a longitudinal bore;
    a rotor shaft disposed within the bore and rotatable with respect to the stator;
    a plurality of bearing assemblies that support the rotor within the stator, the bearing assemblies each comprising:
        a bearing sleeve mounted to the shaft for rotation therewith, the bearing sleeve having a communication passage extending from an inner diameter to an outer diameter of the bearing sleeve;
        an annular sleeve insert that radially surrounds the bearing sleeve, the sleeve insert having first and second ends facing in opposite axial directions;
        an axial passage extending through the shaft;
        a lateral passage extending from the axial passage in communication with the communication passage in the bearing sleeve for delivering lubricant from the axial passage to the communication passage to provide a fluid film barrier between the bearing sleeve and the sleeve insert;
        a bearing carrier having an inner diameter that receives the sleeve insert;
        a pair of annular coil springs mounted around the sleeve insert between the first and second ends of the sleeve insert and in frictional engagement with the inner diameter of the bearing carrier;
        an anti-rotation ring on an outer diameter of the bearing carrier that frictionally grips an inner diameter of the stator;
        a pair of elastomeric seals mounted to the inner diameter of the bearing carrier, each of the seals being in sealing engagement with one of the ends of the sleeve insert, defining a fluid chamber between the inner diameter of the bearing carrier and an outer diameter of the sleeve insert; and a fluid metering passage in the sleeve insert in fluid communication with the fluid film barrier and the fluid chamber to meter fluid between the fluid film barrier and the fluid chamber when the rotor shaft is moved laterally within the bore.

9. The electrical submersible pump motor of claim 8 further comprising a pair of retainers, each mounted to and protruding inward from the inner diameter of the bearing carrier for retaining one of the seals.

10. The electrical submersible pump of claim 9 wherein the resilient seal is supplemented by an annular oil seal.

11. The electrical submersible pump of claim 10 wherein a snap ring engages an inner surface of the sleeve insert holder.

12. The electrical submersible pump motor of claim 8 further comprising a sensor device in operable association with at least one of said plurality of bearing assemblies for detection of an abnormality in the operation of said bearing assembly.

13. The electrical submersible pump motor of claim 12 where in the sensor device is operably associated with a multi-measurement sensor sub that is operable to process sensed parameters and transmit said parameters to a surface of a well bore.

14. The electrical submersible pump motor of claim 12 wherein the sensor device comprises a thermocouple sensor for sensing changes in temperature proximate said bearing assembly.

15. The electrical submersible pump motor of claim 12 wherein the sensor device comprises an accelerometer.

16. In an electrical submersible pump motor having a rotatable rotor shaft assembly within a fixed stator, the motor being filled with a lubricant, the improvement comprising:

an annular bearing carrier surrounding the rotor shaft assembly;

at least one resilient frictional gripping member on an outer diameter of the bearing carrier that frictionally engages an inner diameter of the stator to prevent rotation of the bearing carrier;

an annular sleeve insert surrounding the rotor shaft assembly and located within an inner diameter of the bearing carrier;

an axial passage extending through the rotor shaft assembly and having at least one lateral outlet passage leading to an inner diameter of the sleeve insert for creating a lubricant film on the inner diameter of the sleeve insert;

a fluid spring chamber defined by a pair of seals between the sleeve insert and the bearing carrier; and a metering passage in the sleeve insert to transmit lubricant between the lubricant film and the fluid spring chamber.

17. The bearing assembly of claim 16, further comprising at least one anti-rotation spring encircling the sleeve insert within the chamber, the spring frictionally engaging the inner diameter of the bearing carrier.

* * * * *

UNITED STATES PATENT AND TRADEMARK OFFICE
CERTIFICATE OF CORRECTION

PATENT NO. : 6,566,774 B2
DATED : May 20, 2003
INVENTOR(S) : Larry James Parmeter et al.

It is certified that error appears in the above-identified patent and that said Letters Patent is hereby corrected as shown below:

Column 2,
Line 52, after "disposed" insert -- in --

Column 4,
Line 14, delete "One" and insert therefor -- On --

Column 5,
Line 12, delete "winds" and insert therefor -- windings --

Column 7,
Line 24, delete "where in" and insert therefor -- wherein --

Signed and Sealed this

Twenty-ninth Day of July, 2003

JAMES E. ROGAN
*Director of the United States Patent and Trademark Office*